United States Patent [19]

Chanzy et al.

[11] Patent Number: 4,851,522

[45] Date of Patent: Jul. 25, 1989

[54] PROCESS FOR THE PREPARATION OF SOLUTIONS OF A LIGNO-CELLULOSIC MATERIAL AND SOLUTIONS OBTAINED

[75] Inventors: Henri Chanzy, La Tronche; Michel Paillet, Grenoble; Alain Peguy, Meylan, all of France

[73] Assignee: Centre National de la Recherche Scientifique, France

[21] Appl. No.: 210,132

[22] Filed: Jun. 3, 1988

Related U.S. Application Data

[63] Continuation of Ser. No. 930,130, Oct. 31, 1986, abandoned.

[51] Int. Cl.$^4$ .............................................. C08G 18/10
[52] U.S. Cl. .................................................... 536/56
[58] Field of Search ......................................... 536/56

[56] References Cited

U.S. PATENT DOCUMENTS

| | | | |
|---|---|---|---|
| 4,145,532 | 3/1979 | Franks et al. | 536/56 |
| 4,196,282 | 4/1980 | Franks et al. | 536/56 |
| 4,256,613 | 3/1981 | Franks et al. | 536/56 |
| 4,284,545 | 8/1981 | Franks et al. | 536/56 |
| 4,416,698 | 11/1983 | McCorsely | 536/56 |

FOREIGN PATENT DOCUMENTS

| | | |
|---|---|---|
| 2423559 | 11/1979 | France . |
| 1144048 | 9/1967 | United Kingdom . |

OTHER PUBLICATIONS

Chemical Abstracts, vol. 102, No. 10, Mar. 11, 1985, p. No. 63, OJI Paper Co., Ltd., Oct. 12, 1984.
Chemical Abstracts, vol. 73, No. 26, Dec. 28, 1970, p. 63, (Likhovid R.D.).
Journal of Polymer Science: "Polymer Letters Edition", vol. 22, 1984, John Wiley & Sons, Inc.

*Primary Examiner*—Joseph L. Schofer
*Assistant Examiner*—Peter D. Mulcahy
*Attorney, Agent, or Firm*—Arnold, White & Durkee

[57] ABSTRACT

A process for the preparation of solutions of ligno-cellulosic materials comprising dissolving hydrolyzed ligno-cellulosic material in a solution of tertiary amine N-oxide.

8 Claims, No Drawings

PROCESS FOR THE PREPARATION OF SOLUTIONS OF A LIGNO-CELLULOSIC MATERIAL AND SOLUTIONS OBTAINED

This is a continuation of application Ser. No. 06/930,130 filed Oct. 31, 1986, now abandoned which is based on PCT application PCT/FR 86-00077, filed Mar. 11, 1986.

The invention concerns a process for the preparation of solutions of ligno-cellulosic material; it relates more particularly to a process for preparing such solutions suitable for spinning or any other mode of shaping; it also concerns the solutions prepared in this manner, particularly the solutions intended to be shaped, especially spun.

A ligno-cellulosic material which comes from plants (straw, corn, . . . ) or wood, essentially contains lignin and cellulose.

It is well known to use cellulose for making yarns, fibers or films. The most wide-spread process is the so-called "viscose process" which, however, necessitates employing a dissolving pulp which is an expensive product and which, in the majority of countries, must be imported. Thus, attempts have been made for a long time, unfortunately without success, to find an alternative source which is more easily accessible and more available, and therefore less expensive. Furthermore, the viscose process as exploited at the present time, despite all, is very complex, and necessitates very high investments, which renders it expensive. Finally, the viscose process is very pollutant.

In order to overcome the latter drawbacks, it was then proposed to dissolve the pure cellulose in organic solutions. For example, in Patents GB-A-1 144 048 and FR-A-2 398 758, it has been suggested to use as a solvent a tertiary amine oxide. This solution gives excellent results, but it still employs a pure cellulose, i.e. a raw material which is expensive and not easily available.

Similarly, in order to avoid degradation of the polymer chains of the cellulose, which adversely affects the rheological properties of the products, it has been proposed to add to the spinning solution antioxidant organic products. Unfortunately, these compounds increase the cost.

The present invention overcomes these drawbacks. It provides a process for the preparation of solutions of ligno-cellulosic materials which is easy to carry out, gives excellent results, particularly from the standpoint of spinnability and, especially, may be used with very varied, easily available sources of raw materials.

This process for the preparation of solutions of ligno-cellulosic materials comprises dissolving the previously hydrolyzed ligno-cellulosic material in a solution of tertiary amine N-oxide.

In other words, the invention resides essentially in the combination of two separately known means, namely the use:

of hydrolyzed ligno-cellulosic materials,
of tertiary amine-oxides as solvents.

Ligno-cellulosic materials are used in Patents US-A-1 655 618 to WH. MASON and CA-A-1 096 379 to DE LONG: a process hydrolysis of these materials has been described which consists in placing shavings of wood or of these materials in a reactor under pressure where water vapour is introduced, which provides hydrolysis of the ligno-cellulosic material. This hydrolysis is then left to take place for a few seconds, then the pressure is suddenly released in order to make an explosion which provokes fibrilltion of the starting ligno-cellulosic material. These products are highly destructured, since the lignin is much depolymerized, the hemicelluloses are degraded and the cellulose is also depolymerized. After washing to eliminate the soluble parts such as sugars, oligomers, and the hemi-celluloses, a hydrolyzed product is collected which contains by weight about 40% of lignin and 60% of cellulose. These properties vary as a function of the duration of the phase of hydrolysis. This technique, known under the name of "hydrolysis under pressure and release" or more generally under the English expression "flash", is used for the manufacture of products serving essentially for the preparation of agglomerated boards, of chemical products such as ethanol or glues, and cattle feed. However, these hydrolyzed ligno-cellulosic materials are soluble with difficulty in the majority of organic solvents and therefore do not lend themselves to spinning or extrusion whilst, on the contrary, their cost remains very attractive.

It is therefore surprising that the use of the tertiary amine N-oxides, being known as solvents for celluloses, may make it possible to dissolve the pulps of hydrolyzed ligno-cellulosic materials, i.e. containing cellulose and lignin, whilst it was known that this solvent (tertiary amine oxide) was certainly effective for the cellulose but was totally ineffective with respect to native or in situ lignin (as for example found in wood shavings). Thus, the prior art teachings in no way suggested this type of solvent compound to one of ordinary skill in the art. Actually even dissuaded him from using such solvents.

It may be thought that the action of this solvent on lignin is facilitated by the increased accessibility further to the depolymerization provoked by the phase of hydrolysis and defibrillation caused by the explosion. This clearly shows that there is a relation between this phase of hydrolysis and this type of solvent.

Advantageously, in practice:

the solvent solution is formed by a mixture of tertiary amine N-oxide and a hydroxylated compound, preferably selected from the group consisting of water and the alcohols; the molar ratio between said hydroxylated compound and the tertiary amine oxide is between 0 and 1; if this molar ratio is equal to 0, the solvent in the anhydrous state being in solid form, there is a right of explosions on the other hand, if this molar ratio is greater than 1, it has been ascertained that the properties of dissolution disappear, probably due to the act that the atom of oxygen of the amine oxide was engaged in other hydrogen bonds which rendered it inactive;

the tertiary amine oxide is selected from the group consisting of dimethylethanolamine oxide, triethylamine oxide, the N-oxide of 2-N-(hydroxy-2-propoxy), N-dimethylamine, certain monocyclic N-oxides of N-methylamine, such as the N-oxide of N-methylmorpholine, the N-oxide of N-methylpiperidine, the N-oxide of N-methylhomopiperidine, the N-oxide of N-methylpyrolidine, as well as other tertiary amine oxides in which the amine oxide group is located outside the ring, such as the N-oxide of di-N-methylcyclohexylamine, the N-oxide of dimethylhexylamine and the N-oxide of N,N,dimethylbenzylamine; the percentage of hydroxylated compound (which may be water) which is mixed with the tertiary amine N-oxide in the solvent of the cellulose varies from one tertiary amine N-oxide to the other up to a value of about 30% by weight with respect to the weight of the solvent; as is known, the tertiary amine N-oxides are well known compounds described in the art, for example in U.S. Patent US-A-3 508 941;

the solution contains at maximum 40% and preferably between 5 and 30% by weight of hydrolyzed ligno-cellulosic materials with respect to the weight of the solution; thus, if this solvent is the N-oxide of N-methyl-morpholine, the water content of the solvent may attain about 13% by weight and the cellulose content about 35% by weight with respect to the total weight of the solution;

the basic ligno-cellulosic material is hydrolyzed by the technique described hereinabove under pressure then sudden release at atmospheric pressure; advantageously, when the pressure of hydrolysis is close to 40 bars, as is usually the case, the duration of hydrolysis is between 25 and 140 seconds; it has been ascertained that, if, at 40 bars, the duration of hydrolysis is less than 25 seconds, this hydrolysis was insufficient, with the result that the solution obtained contained insoluble parts, rendering it difficult to spin; on the other hand, if the duration is greater than 140 seconds, the material was depolymerized and the solution obtained was too liquid to be spun; it goes without saying that other conditions of hydrolysis such as pre-impregnation of the material, addition of chemical reagents to promote depolymerization of the lignin whilst preserving to a maximum the degree of polymerization of the cellulose, duration and different pressure, giving an identical material, will be able to be used;

the tertiary amine N-oxide may also be diluted by an organic compound representing up to 25% by weight of the total weight of the solution, in order to reduce the viscosity of the solution; an aprotic organic liquid may be used which does not dissolve the cellulose and does not react chemically with the characteristic solvent (tertiary amine N-oxide), and which does not provoke degradation of the cellulose but, however, presents a high degree of polarity. Dimethylsulfoxide, N,N-dimethylformamide, N,N-dimethylacetamide, N-methylpyrrolidinone, hexamethylphosphorotriamide, acetonitril, sulfolane and the like may be mentioned;

the basic hydrolyzed ligno-cellulosic material is ground, then mixed with the solvent composition based on tertiary amine N-oxide, and finally the mixture is heated with stirring to a temperature of between 70° and 150° C., preferably 75° to 130° C.; in a variant, the heating step is effected under controlled vacuum so as progressively to eliminate the water in order to obtain the desired molar ratio water/anhydrous tertiary amine oxide;

the basic ligno-cellulosic material is a mixture of wood shavings and of paper pulps to which have possibly been added polymers selected from the group consisting of the cellulosic derivatives, the hemi-celluloses, chitosan, polyamides, polyacrylates, polyvinyl alcohols, polysaccharides, and this in the proportion for example of 10% by weight.

The solutions of ligno-cellulosic materials prepared in accordance with the invention by dissolution of these hydrolyzed materials in a tertiary amine N-oxide, have a high content of dissolved matter (cellulose and lignin); the solutions are of a viscosity which enables them easily to be fashioned, particularly by extrusion or spinning.

These phases of extrusion or of spinning are effected in known manner. Advantageously, the non-solvent of the pulp to be shaped or spun, and the regeneration agent for shaping (yarn, film, celluloar structure) are generally identical. In practice, water is used.

When it is desired to transform these products into films or yarns, the pulp is extruded continuously through appropriate dies in a regeneration bath (water, mono- and polyvalent lower alcohol, etc. . . . ). Advantageously, the regeneration bath preferably contains up to 40% by weight of tertiary amine oxide.

The process according to the invention presents numerous advantages with respect to those known heretofore. Mention may be made of:

the possibility of employing as basic raw materials ligno-cellulosic materials which are wide-spread and easily available, such as straw, corn and especially wood, making it possible to lower the price of the raw material considerably and to be dependent on imports no longer;

the possibility thus of making fibers very economically for very varied uses;

the antioxidant effect of the lignin which preserves the degree of polymerization of the cellulose;

the possibility of easily storing the solutions before use, even for several weeks and without particular precaution, which is not allowed by the present viscose process, which thus no longer makes it necessary to spin continuously;

the possibility of using conventional techniques in the thermoplastics industry for shaping these solutions.

In this way, these solutions may be fashioned with success for multiple applications. By way of example, mention may be made of:

the manufacture of continuous filaments or of discontinuous fibers;

the manufacture of films;

the manufacture of drawn films adapted to be fibrillated or to be used for packing or as membranes with selective porosity;

the manufacture of cellular structures of the sponge type.

The manner in which the invention may be implemented and the advantages following therefrom will appear more clearly from the following embodiments given by way of indicative and non-limiting examples. Unless indicated to the contrary in these examples, the parts and percentages are expressed by weight.

EXAMPLE 1

By the "Flash" hydrolysis process described in U.S. Patent US-A-1 655 618, ten grams of a poplar wood pulp are hydrolyzed for a duration of 60 seconds under 40 bars. After sudden pressure reduction and washing with water, the ground and dried product contains about 6% water.

At ambient temperature, to 5 grams of this ground product (or 15% of the final solution), are added 28.33 grams (or 85%) of N-methylmorpholine oxide (MMNO) having a water content of about 13.5%. The mixture is homogenized, then progressively heated to 130° in a glass tube for twenty minutes. For the whole of the heating, the solution is stirred by hand, particularly with a glass stirrer. After twenty minutes, the hydrolyzed wood pulp is totally dissolved.

This solution is then spun at 110° C. through a die with a diameter of 300 microns. After a path of about twenty centimeters in the air, the fiber is wound in the water at a speed of 60 m/min. The regenerated cellulose filament obtained is then washed with water until virtually all the tertiary amine N-oxide is eliminated.

The yarns thus obtained present the following characteristics:
modulus (standard ASTM-D 638): 14 GPa
tenacity (standard ASTM-D 638): 0.3 GPa
elongation at rupture (standard ASTM-D 638): 4%

By way of comparison, these values correspond substantially to those of the so-called low-range rayons widely marketed at the present time.

EXAMPLE 2

Example 1 is repeated, excepted for using as solvent dimethylethanolamine oxide (DMEAO), and for the quantities of materials hereinafter, namely 3.83 g (11.5%) of hydrolyzed wood pulp (hydrolysis time: 40 seconds under 40 bars) containing about 6% water, and 29.5 g (88.5%) of DMEAO with a water content of about 11% by weight. This mixture is heated to 130° C. for twenty minutes.

This solution, bereft of insoluble matter, is spun at 75° C. and the yarns obtained present substantially the same characteristics as in Example 1.

EXAMPLE 3

Example 1 is repeated, taking the duration of the hydrolysis phase to 90 seconds. The solution obtained is bereft of insoluble parts and may be conveniently spun at 73° C. under the same conditions as in Example 1.

EXAMPLE 4

To 3.75 g of hydrolyzed wood pulp (hydrolysis time: 165 seconds under 40 bars), containing about 6% of water, there are added 28.9 g of N-methylmorpholine oxide (MMNO) having a water content of about 40% by weight with respect to the quantity of amine oxide. The mixture is heated to 90° C. under controlled vacuum. This temperature is then taken to 100° C. over a duration of about 25 minutes. The solution is then heated for five minutes to 120° C. The final concentration of wood pulp is about 15%. This solution no longer presents any insoluble parts.

However, this solution is too liquid to be spinnable.

EXAMPLE 5

Example 1 is repeated, effecting hydrolysis only for twenty seconds.

The solution obtained contains many insoluble parts and is not spinnable.

EXAMPLE 6

Example 1 is repeated with the following quantities of material. To 2.6 g (13% of hydrolyzed and ground wood pulp) (hydrolysis time: 90 seconds under 40 bars), containing about 6% of water, there are added 0.2 g of an antioxidant additive compound (1% propylgallate) and 0.7 g (3.5%) of a kraft pulp having a degree of polymerization of 1500 and containing about 5% of water. To this composition are added 16.7 g (83.5% of N-methylmorpholine oxide (MMNO) having a water content of about 13.5% by weight.

In other words, it is thus sought to increase the degree of polymerization and to reduce the content of lignin. The mixture is then heated to 120° C. for fifteen minutes.

The solution obtained is bereft of insoluble parts. After spinning at 90° C. under the same conditions as in Example 1, but with a speed of 100 m/min., a yarn is obtained having the following characteristics:
modulus: 27 GPa
tenacity: 0.5 GPa
elongation: 4%

These yarns are therefore comparable with the best commercial rayon yarns at present, even with high-tenacity rayon yarns.

Thus, with 80% of very inexpensive ligno-cellulosic material, to which is added a likewise inexpensive Kraft pulp complement, a material is obtained, comparable with the best viscoses at present. In this way, with equal performance, this results in a very substantial saving of raw material since the latter is of the order of at least 1 to 5. In addition, this technique may be exploited with materials readily available everywhere, this avoiding importation problems.

EXAMPLE 7

Example 6 is repeated, degasifying and filtering the solution obtained before spinning, as is usual to do in viscose. The mechanical properties of the yarns obtained are improved.

EXAMPLE 8

Example 2 is repeated, adding as co-solvent 1.4 g of DETA (diethylenetriamine) to 12.282 g of DMEAO having a water content of about 5.5% by weight with respect to the quantity of amine oxide. The mixture is then homogenized at 90° C. then has 2.3 g of hydrolyzed wood pulp (hydrolysis time: 60 seconds under 40 bars) added thereto. The solution is heated for 20 minutes to 90° C. The addition of DETA facilitates swelling and reduces viscosity.

The solution obtained is bereft of insoluble matter and is spun at 90° C. with success under the same operational conditions as in Example 2.

We claim:

1. A process for the preparation of a solution containing ligno-cellulosic material in a tertiary amine N-oxide, comprising:
   hydrolyzing ligno-cellulosic material under an elevated pressure;
   suddenly releasing the pressure on the hydrolyzed ligno-cellulosic material from said elevated pressure to about atmospheric pressure;
   mixing the hydrolyzed ligno-cellulosic material with tertiary amine N-oxide solvent to form a solution, said solvent comprising no more than 40% by weight of said hydrolyzed ligno-cellulosic material; and
   heating the solution with stirring to a temperature of from 70° to 150° C.

2. A process according to claim 1, wherein the solution comprises a mixture of tertiary amine N-oxide and a hydroxylated compound.

3. A process according to claim 2, wherein the hydroxylated compound is selected from the group consisting of water and alcohols with low molecular weight, the molar ratio between said hydroxylated compound and the tertiary amine oxide being between 0 and 1.

4. A process according to claim 1, wherein the tertiary amine oxide solvent is selected from the group consisting of dimethylethanolamine oxide, triethylamine oxide, the N-oxide of (hydroxy-2-propoxy)-2-N,N-dimethylamine, monocyclic N-methylamine N-oxides, and tertiary amine oxides in which the amine oxide group is located outside the ring.

5. A process according to claim 1, wherein the solution contains from 5 to 30% by weight of ligno-cellulosic materials.

6. A process according to claim 1, wherein hydrolysis is effected under a pressure close to 40 bars for a duration of between 25 and 140 seconds.

7. A process according to claim 6, wherein the hydrolyzed ligno-cellulosic material is ground, washed with water, partially dried and then mixed with the tertiary amine N-oxide, then the solution is heated with stirring to a temperature of between 115° and 130° C.

8. A process according to claim 1, wherein the ligno-cellulosic material comprises a mixture of hydrolyzed wood and of paper pulps to which is added a polymer selected from the group consisting of polyamides, polysaccarides, polyacrylates, polyvinyl alcohols, cellulosic derivatives and hemi-celluloses.

* * * * *